US012749088B2

(12) United States Patent
Ghosh et al.

(10) Patent No.: US 12,749,088 B2
(45) Date of Patent: Sep. 29, 2026

(54) METHOD AND SYSTEM FOR PREDICTING CONTENT CONSUMPTION

(71) Applicant: GLANCE INMOBI PTE. LIMITED

(72) Inventors: Taniya Ghosh, Junnasandra (IN); Daood Shaheer, Lucknow (IN); Ian Anderson, Monmouthshire (GB)

(73) Assignee: GLANCE INMOBI PTE. LIMITED, Singapore (SG)

( * ) Notice: Subject to any disclaimer, the term of this patent is extended or adjusted under 35 U.S.C. 154(b) by 0 days.

(21) Appl. No.: 18/491,460

(22) Filed: Oct. 20, 2023

(65) Prior Publication Data

US 2025/0014069 A1 Jan. 9, 2025

(30) Foreign Application Priority Data

Jul. 5, 2023 (IN) ............................ 202341045105

(51) Int. Cl.
*G06Q 30/0242* (2023.01)
*G06Q 30/0241* (2023.01)

(52) U.S. Cl.
CPC ..... *G06Q 30/0242* (2013.01); *G06Q 30/0277* (2013.01)

(58) Field of Classification Search
None
See application file for complete search history.

(56) References Cited

U.S. PATENT DOCUMENTS

| | | | | |
|---|---|---|---|---|
| 2012/0110027 | A1* | 5/2012 | Falcon | H04N 21/25866 707/802 |
| 2012/0259707 | A1* | 10/2012 | Thielke | G06Q 30/0267 705/14.64 |
| 2014/0164101 | A1* | 6/2014 | S | G06Q 30/0267 705/14.45 |
| 2017/0308924 | A1* | 10/2017 | Jeon | G06Q 30/0269 |
| 2018/0060915 | A1* | 3/2018 | Liu | G06Q 30/0261 |
| 2020/0034874 | A1* | 1/2020 | Narayan | G06Q 30/0277 |
| 2020/0045519 | A1* | 2/2020 | Raleigh | G06Q 30/02 |
| 2020/0074502 | A1* | 3/2020 | Kishimoto | H04N 21/262 |
| 2020/0097845 | A1* | 3/2020 | Shaikh | G06Q 30/0201 |
| 2021/0201237 | A1* | 7/2021 | Boddu | G06Q 30/0269 |
| 2021/0342866 | A1* | 11/2021 | Girabawe | G06Q 30/0205 |

* cited by examiner

*Primary Examiner* — Vincent M Cao

(57) ABSTRACT

Provided is a method and system for predicting content consumption. The method comprises pushing one or more content into a lock screen of a user device (105) of an initial group of online users from the server (101) and thereby receiving a plurality of initial responses by the server (101). Based on the plurality of initial responses, the method comprises determining a first group of users including a first set of online users and a first set of offline users and thereby receiving a plurality of first responses. Based on the plurality of first responses, the method comprises expanding the first set of offline users by a second set of offline users and thereby receiving a plurality of second responses. The method comprises predicting content consumption based on the plurality of initial responses, the first responses, and the second responses.

20 Claims, 7 Drawing Sheets

METHOD AND SYSTEM FOR PREDICTING CONTENT CONSUMPTION

FIELD OF THE INVENTION

The present invention generally relates to a method and system for communication, and more particularly relates to a method and system for predicting content consumption during interactions with one or more content on a lock screen of a user device during offline and online modes.

BACKGROUND

With the advent of technological advancement in recent times, an internet connection enables seamless communication and connectivity between individuals, organizations, and various institutions across different geographical locations. The internet has revolutionized communication through cost-effective and real-time interaction between individuals or groups of individuals. The internet enables companies to reach a global customer base, provide customer support, establish online marketplaces, and provide secure advertisement (Ad) through different modes of online communication.

Thus, the internet plays a major role for many advertisers to reach global customers in a cost-effective manner. For example, compared to traditional content management such as television or print media, online display of content or online advertising often offers more cost-effective options to reach a larger number of customers than traditional means. The advertiser may set flexible budgets, pay-per-click or pay-per-impression models. The advertiser may track and optimize the content management in real-time or near real-time, ensuring a better return on investment (ROI) based on the online display of content or the online advertising. Further, the internet may enable the advertiser to publish interactive content to understand users' choices. The interactive content may correspond to an interactive advertisement. The interactive advertisement is generally displayed to the user via the user device for receiving appropriate feedback. Accordingly, the advertiser may scale up or scale down production of particular products based on the feedback of the users.

However, the user needs to be "online" to receive the content. The term "online" refers to the user who is actively connected to the internet. Further, the term "online" implies that the person is using internet-connected devices, such as a smartphone, a user device, a mobile, a computer, a tablet, etc., to access online services, websites, or applications. Although online content is a popular choice among advertisers, a majority of users spend a good amount of time without having internet connection to the device, that is, a large number of users remain in an "offline" state. In the "offline" state, implementing an offline content or an offline advertisement poses a challenging task for campaign management. Specifically, the content or advertisement needs to be pushed in full into the user's device while the user is online. Thereby, the pushed content may be displayed to the user during the "offline" state. Further, in a scenario when the user interacts with the content during the offline state, the interaction result is reported to a server when the user again becomes online or reconnects to the internet. The interaction during offline state may result in an inaccurate measurement of the user's interaction. The inaccurate measurement of the user's interaction during the offline state may lead the advertiser to spend extra amounts of money due to inaccurately capturing the user response to the content. For example, the content is pushed in the user's device during online state however, the user provides input during offline state which is not captured properly. Subsequently, the content may be again pushed into the user's device when the user becomes online. Further, the user may respond to the content when the user is online. Therefore, the advertiser may have to spend for two impressions, whereas the campaign management only captures the response when the user is online. Therefore, the advertiser may require spending extra in absence of an accurate determination of the response during offline mode.

In addition, the user generally receives the content during interaction via websites or Applications on the user's device. However, the advertiser may opt for showing the content before unlocking the user device, such as on a lock screen of any user device or mobile phone. The reason behind showing the content on the lock screen is that the user has to at least view the lock screen of the user device or mobile phone before performing any further action. Therefore, showing the content on the lock screen may increase the probability of receiving the response from the user. However, showing content on the lock screen may pose a significant challenge as full content requires to be pushed to the device while the user device is connected to the internet. Else, grayed-out content or a portion of the content may be shown to the user on the lock screen of the user device, which may cause dissatisfaction in the user's mind.

Therefore, in order to solve the above-mentioned problems, there lies a need to provide a method and system for predicting content consumption.

SUMMARY

This summary is provided to introduce a selection of concepts, in a simplified format, that are further described in the detailed description of the invention. This summary is neither intended to identify key or essential inventive concepts of the invention nor is it intended for determining the scope of the invention.

A method for predicting content consumption by users of user devices is disclosed. The method comprises, pushing, by a server, one or more content to a user device of each user of an initial group of online users for displaying the one or more content on a lock screen of the user device, receiving, by the server, a plurality of initial responses, from one or more users of the initial group of online users, to each of the one or more content displayed on the lock screen of each the user devices, identifying, by the server, based on a number of the plurality of initial responses, a first group of users and pushing the one or more content to the user devices of each of the first group of users, the first group of users comprising users other than users in the initial group of online users, and comprises a first set of online users and a first set of offline users, receiving, by the server, a plurality of first responses from one or more users of the first set of online users and the first set of offline users of the first group of users, to each of the one or more content displayed on the lock screen of each the user device of the first set of users, expanding, by the server, the first set of offline users by a second set of offline users and pushing the one or more content, based on a performance of the plurality of first responses from the first set of offline users and the first set of online users, receiving, by the server, a plurality of second responses from one or more users of the expanded first set of offline users, and predicting, by the server, the content consumption based on the plurality of initial responses, the plurality of first responses, and the plurality of second responses.

Further, a system for predicting content consumption by users is disclosed. The system comprises, server comprising a processor communicatively connected to a memory and the processor configured for, pushing one or more content to a user device of each user of an initial group of online users for displaying the one or more content on a lock screen of the user device, receiving a plurality of initial responses, from the one or more users of the initial group of online users, to the one or more content displayed on the lock screen of each of the user device, identifying, based on a number of the plurality of initial responses, a first group of users for pushing the one or more content to the user device of each of the first group of users, the first group of users being other than the initial group of online users and comprising a first set of online users and a first set of offline users, receiving a plurality of first responses from one or more users of the first set of online users and the first set of offline users, expanding the first set of offline users by a second set of offline users for pushing the one or more content, based on a performance of the plurality of first responses from the first set of offline users and the first set of online users, receiving a plurality of second responses from one or more users of the expanded first set of offline users, and predicting the content consumption based on the plurality of initial responses, the plurality of first responses, and the plurality of second responses.

To further clarify the advantages and features of the present invention, a more particular description of the invention will be rendered by reference to specific embodiments thereof, which is illustrated in the appended drawing. It is appreciated that these drawings depict only typical embodiments of the invention and are therefore not to be considered limiting its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Figure 1:
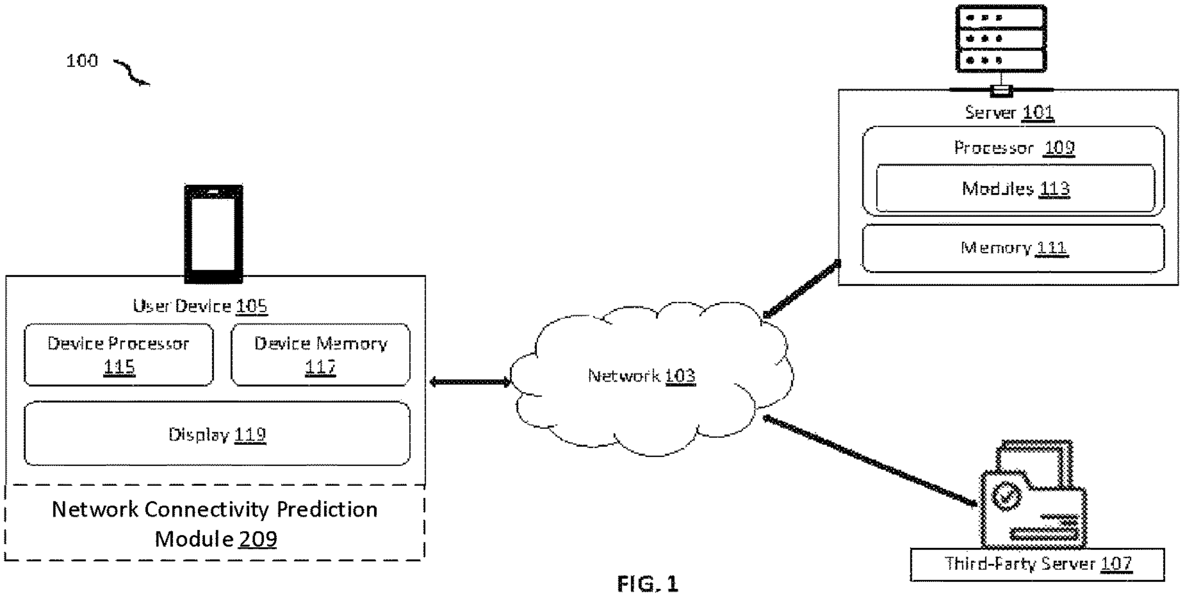
FIG. 1 illustrates a schematic block diagram of a system for predicting content consumption, in accordance with an embodiment of the present disclosure.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having the benefit of the description herein.

DETAILED DESCRIPTION

For the purpose of promoting an understanding of the principles of the invention, reference will now be made to the various embodiments and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

The term “some” or “one or more” as used herein is defined as “one”, “more than one”, or “all.” Accordingly, the terms “more than one,” “one or more” or “all” would all fall under the definition of “some” or “one or more”. The term “an embodiment”, “another embodiment”, “some embodiments”, or “in one or more embodiments” may refer to one embodiment or several embodiments, or all embodiments. Accordingly, the term “some embodiments” is defined as meaning “one embodiment, or more than one embodiment, or all embodiments.”

The terminology and structure employed herein are for describing, teaching, and illuminating some embodiments and their specific features and elements and do not limit, restrict, or reduce the spirit and scope of the claims or their equivalents. The phrase “exemplary” may refer to an example.

More specifically, any terms used herein such as but not limited to “includes,” “comprises,” “has,” “consists,” “have” and grammatical variants thereof do not specify an exact limitation or restriction and certainly do not exclude the possible addition of one or more features or elements, unless otherwise stated, and must not be taken to exclude the possible removal of one or more of the listed features and elements, unless otherwise stated with the limiting language “mush comprise” or “needs to include.”

Whether or not a certain feature or element was limited to being used only once, either way, it may still be referred to as “one or more features”, “one or more elements”, “at least one feature”, or “at least one element.” Furthermore, the use of the terms “one or more” or “at least one” feature or element does not preclude there being none of that feature or element unless otherwise specified by limiting language such as “there needs to be one or more” or “one or more element is required.”

Unless otherwise defined, all terms, and especially any technical and/or scientific terms, used herein may be taken to have the same meaning as commonly understood by one having ordinary skill in the art.

Embodiments of the present invention will be described below in detail with reference to the accompanying drawings.

The term "impression" used in the present description corresponds to one or more content loaded into a user device.

The term "online" used in the present description may refer to a user using the user device connected to the internet or a user device itself which is connected to the internet or an active data network to access and communicate with online services, websites, and other devices over the network.

The term "offline" used in the present description may refer to the user using the user device or the user device itself, which does not have any internet connection or the active data network. The "offline" state may also be popularly known as airplane state or flight mode.

The term "lock screen" used in the present description corresponds to an initial screen that appears on a user's device, such as a smartphone, a mobile phone, a tablet device, or a computer, when the user device is locked or is awakened from a sleep state but before the user enters a password or equivalent to unlock the device.

The term "Advertisement" and "Ad" may be used as synonyms throughout the description and refer to an advertisement in digital format.

Displaying content on the lock screen and thereby capturing the accurate response of the users at the time of offline state may be a challenging task for predicting the content consumption during the campaign management.

Therefore, there lies a need to provide a method and system for predicting content consumption while showing the content on the lock screen of the user device and thereby accurately capturing user response during offline state along with the online state.

FIG. 1 illustrates a schematic block diagram of a system for predicting content consumption, in accordance with an embodiment of the present disclosure. The system 100 includes a server 101, one or more user devices 105, and a third-party server 107. The server 101, the one or more user devices 105 (hereinafter referred to as "the user device"), and the third-party server 107 are communicatively connected to one another through a network 103. In a non-limiting example, the user device 105 may be a smartphone, mobile device, laptop, tablet, etc. Further, the server 101 may be an Ad server, a content server, a web server, etc.

According to an embodiment, the server 101 includes one or more processors 109, and a memory 111 communicatively coupled to the one or more processors 109 (hereinafter referred to as "the processor"). The processor 109 includes one or more modules 113 (hereinafter referred to as "the module") for performing specific operations. The server 101 is a computer or system for providing services or resources to other computers or devices, i. e., one or more clients, over the network. The server 101 performs a crucial role in managing and distributing data, applications, and network resources to facilitate communication and collaboration. In a non-limiting example, the server 101 in the present disclosure may relate to the Ad server. The Ad server relates to a platform for delivering and managing advertising content to targeted users on websites, mobile applications, lock screens, or other platforms. The Ad server is primarily responsible for serving advertising content to target users based on various parameters such as geography, demography, interests, behavior, etc. The Ad server generally provides detailed report and analytics that allow advertisers and publishers to measure the effectiveness of the campaign. The advertiser and publishers may be able to track various metrics like impressions, clicks, conversions, and the ROI to optimize spending on the campaign based on the business growth of the advertiser.

The processor 109 of the server 101 is a central processing unit (CPU). As an exemplary embodiment, the processor 109 may be one or more general processors, digital signal processors, application-specific integrated circuits, field-programmable gate arrays, servers, networks, digital circuits, analog circuits, combinations thereof, or other now-known or later-developed devices for analyzing and processing data. The processor 109 may implement a software program, such as code generated manually (that is, programmed).

The processor 109 includes the module 113 for performing specific operations. The term "module" or "modules" used herein may imply a unit including, for example, one of hardware, software, and firmware or a combination of two or more of them. The "module" may be interchangeably used with a term such as logic, a logical block, a component, and the like. The "module" may be a minimum system component for performing one or more functions or maybe a part thereof. The processor 109 may control the module to execute a specific set of operations described in the disclosure.

The memory 111 may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The memory 111 is communicatively coupled with the processor 109 to store bitstreams or processing instructions for completing the process.

According to an embodiment, the user device 105 includes one or more device processors 115, a device memory 117, and a display 119 for displaying Ads or advertising content to the users. The one or more device processors 115 (hereinafter referred to as "the device processor") may include one or more device modules for performing operations.

The device processor 115 may be communicatively coupled to the device memory 117. The device processor 115 may be configured to perform one or more operations to execute the required functionality. The device processor 115 and the one or more device modules may relate to the processor 109 and the modules 113, respectively. Therefore, for the sake of brevity, the detailed explanation of the device processor 115 and the one or more device modules are excluded herein.

The device processor 115 is configured to receive one or more content (hereinafter referred to as "the content") for pushing on the user device 105 of each user of an initial group of online users. The server 101 identifies the initial group of online users from a plurality of target users being identified based on one or more criteria provided by an advertiser. The device processor 115 is further configured to transmit a plurality of initial responses from one or more users of the initial group of online users based on the content displayed on the lock screen. Thereby, the device processor 115 is configured to transmit a plurality of first responses from one or more users of a first group of users. The first group of users comprises a first set of online users and a first set of offline users. The server 101 is configured to identify the first group of users based on the plurality of initial responses in comparison with a predetermined threshold value. If the plurality of initial responses is greater than or equal to the predetermined threshold value, the server 101 identifies the first group of users that includes the first set of online users and the first set of offline users. The device processor 115 is further configured to transmit a plurality of second responses from an expanded first set of offline users to predict the content consumption. The content consumption is predicted based on the transmitted initial responses, the first responses, and the second responses. The server 101 is configured to expand the first set of offline users by a second set of offline users based on a performance of the plurality of first responses from the first set of offline users and the first set of online users.

The device memory 117 relates to a memory unit present in the user device for storing executable instructions and data required for any execution. The device memory 117 may be of a similar type as the memory 111 of the server 101. Therefore, for the sake of brevity, the detailed description of the device memory 117 is excluded herein.

The display 119, also referred to as a display screen or a monitor, is an output device that visually presents information to the user. The display 119 is an integral part of various electronic devices, including computers, smartphones, mobiles, user devices, tablets, televisions, and more. The primary purpose of the display 119 is to render visual content and provide a user interface for interacting with the user device 105. For the sake of brevity and to increase the succinctness of the specification, the display 119 is described in later sections of the specification in FIG. 7, wherein the display 119 relates to display 710 of FIG. 7.

According to an embodiment, the third-party server 107 may refer to an external service or platform that handles authentication and authorization for advertising-related activities. The third-party server 107 generally serves as a trusted intermediary between advertisers, publishers, and various advertising platforms, ensuring secure and reliable access to advertising resources and data. In a non-limiting example, an Ad technology platform delivers 1000 impressions to the user device and thereby bill $1000 (i. e., at the rate of $1 for each impression) to the advertisers. In this scenario, the third-party server 107 is responsible for authenticating that the Ad technology platform delivers 1000 impressions and thereby billing for a correct number of impressions only. In addition, the third-party server 107 may also be responsible for user authentication, security, privacy, user data management, and seamless integration, among others.

According to an embodiment, the network 103 refers to any entity that performs one or more functionalities of a network connection between the server 101, the user device 105, and the third-party server 107. The network 103 may be further configured to connect with external media, memory, or any other components in a system, or combinations thereof. The network connection may be a physical connection, such as a wired Ethernet connection, or may be established wirelessly. Likewise, the additional connections with other components of the system 100 may be physical or may be established wirelessly. In the "online" state, the user device 105 is actively connected to the network 103 via the internet connection. Alternatively, in the "offline" state, the user device 105 is not connected with the network 103 via the internet connection.

Figure 2:
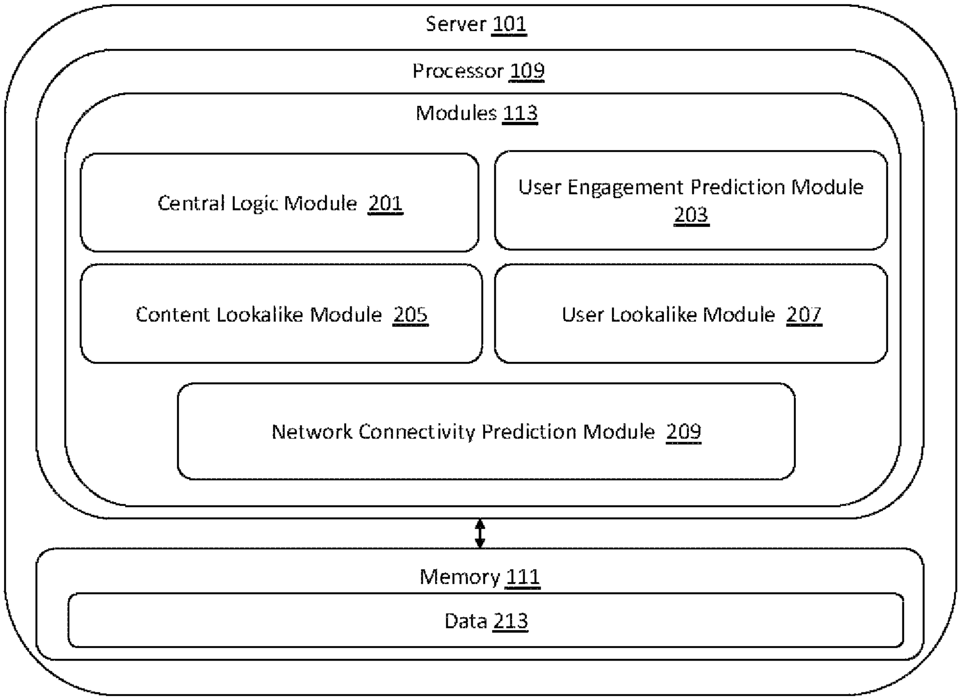
FIG. 2 illustrates a detailed block diagram of the server shown in FIG. 1, in accordance with an embodiment of the present disclosure.

FIG. 2 illustrates a detailed block diagram of the server as shown in FIG. 1, in accordance with an embodiment of the present disclosure.

According to an embodiment, the server 101 includes the processor 109 and the memory 111, where the memory 111 is communicatively coupled with the processor 109. The processor 109 includes the module 113, such as a central logic module 201, a user engagement prediction module 203, a content lookalike module 205, a user lookalike module 207, and a network connectivity prediction module 209. Further, the memory 111 includes data 213. The data 213 may store executable instructions and/or data generated when the module 113 executes one or more operations. Further, the data 213 may store pre-defined threshold values, one or more machine learning models, and other data which may be required for execution of the one or more modules 113.

In an exemplary embodiment, the Ad technology platform may provide free-to-consumer content to increase consumer base and thereby provides content or Ads to the consumer based on requirement set by the advertiser. Therefore, the consumer gets free content along with the Ads. Based on the Ads provided to the users, the Ad technology platform generates revenue in the form of a traditional digital Ad ecosystem.

In another exemplary embodiment, the Ads are required to be published or shown to the users based on a total budget set by the advertisers. Therefore, the Ad technology platform is responsible for displaying the Ads within the total budget. Further, the Ad technology platform requires to adhere to the time period within which the advertisers wish to publish the Ads to the users (for example, within a specific time period of a day, during the whole day, or during a particular day in a week, etc.). Also, utilization of budget needs to be considered along with adhering to the time period for considering distributing the Ads. Therefore, the primary purpose of the campaign is to publish the Ads within the total budget.

According to an embodiment, the central logic module 201 is configured to act as a coordinator for implementing the campaign based on the advertiser's requirement. The central logic module 201 is configured to receive input from all other modules of the system 100, such as the user engagement prediction module 203, the content lookalike module 205, the user lookalike module 207, and the network connectivity prediction module 209. Upon receiving the input from all other modules, the central logic module 201 is configured to make decisions on how to perform on the received input/data. The central logic module 201 may be configured in two scenarios—1) a heuristic-based approach, in which rules, boundaries, and threshold values are defined manually for the Ad management, and 2) an autonomous-based approach, in which rules, boundaries, and threshold values are learned from data in an autonomous manner via machine learning algorithms. The central logic module 201 is responsible for ensuring that the execution of the campaign is satisfied according to the requirement of the advertisers.

According to an embodiment, the user engagement prediction module 203 is configured to make engagement predictions of the users, such as Click Through Rate (CTR), based on the Ad and the understanding of the user based on the features available. A first machine learning model is responsible for predicting user engagement. For example, the advertiser wishes to publish the Ads to a predefined number of female users aged between 34 and 38 years and living in Bangalore city in India. The user engagement prediction module 203 captures data from demographic details available in the user device and thereby predicts a percentage of possibility for responding to the content or Ads provided by the advertisers utilizing the first machine learning model. Based on the percentage, the user engagement prediction module 203 predicts whether the user is suitable for sending the content or Ads to the user device.

According to an embodiment, the content lookalike module 205 is configured to make predictions as to how likely a user is to perform positive interaction with the content or Ad from the campaign. The content lookalike module 205 is configured to predict users based on similar categories of content or Ads responded to by the user based on a second machine learning model. If the user is predicted not to engage with a given content based on a prior lookalike content, then the content lookalike module 205 is configured to deselect the user for pushing the content on the user device 105. Instead, the content lookalike module 205 is configured to push the content to the user who has a similar interest to the prior content to provide a more delightful end-user experience. For example, the user X previously responded to an Ad relating to company Y selling Pizza. Therefore, using the second machine learning model, the content lookalike module 205 is configured to predict that the user X prefers Pizza and thereby pushes the content or Ads relating to Pizza or similar kinds of food to enhance user experience. According to another embodiment, the content lookalike module 205 may be configured in the user device 105 for predicting users to perform positive interactions with the content or Ad.

According to an embodiment, the user lookalike module 207 is configured to identify other users that exhibit behaviors and characteristics similar to a target user. More particularly, if two users share many similar traits then the two users may have similar choices for responding to the content or Ads, which may enhance the prediction probability to select a suitable user. A third machine learning model is used to rank the similarity of users. Based on the ranking between two users, the user lookalike module 207 is configured to identify other users for showing the content or Ads. In a non-limiting example, the user A and the user B have many similar characteristics, such as both A and B belonging to the age of 25, living in the same city, working in the same domain, and searching for similar types of food. Therefore, if the user A responds to a content or Ad XYZ, then based on the third machine learning model, there is a probability that the user B also responds to the content or Ad XYZ. However, the user lookalike module 207 may be noisy in prediction and may not be exact.

According to an embodiment, the network connectivity prediction module 209 is configured to predict when the user is likely to return to the network connection, that is, the internet connection, in the future. The network connectivity prediction module 209 is configured to use data from a Network connectivity log and a fourth machine learning model to generate predictions. The Network connectivity log is maintained in the user device 105 based on user activity for being online and offline from the user device 105. The network connectivity prediction module 209 may be extended to include a context log if the network connectivity prediction module 209 is deployed on the user's device. The context log may include numerous activities related to login and log-out information to various applications including connecting to the active internet. The offline users correspond to one or more users who become online after passing of a predicted time period. The network connectivity prediction module 209 is configured to determine the predicted time period based on a network connectivity log of the user device and the fourth machine learning model. In a non-limiting example, the network connectivity prediction module 209 predicts that the user X is expected to have WiFi connectivity in the next 3 hours using the fourth machine learning model. Further, the context log may be an alternate option for predicting the user activity. However, the context log provides richer, and more elegant data for predicting the user activity. In addition, the context log or monitor may listen for events that can be used to infer a broad context e. g., location data indicating the user is at home, a Bluetooth connection to a car, and so on. The network connectivity prediction module 209 is crucial for determining user activity for having internet connectivity. Without the network connectivity prediction module 209, the server 101 is unable to determine the user activity, such as when a user may become offline or when the user may become online. Thus, based on the prediction, the server 101 may be configured to identify offline users who may become offline after some time and again come online after the predicted time period. Upon identifying the users, the server 101 may be configured to push the content or Ads into the user device 105 of identified users. Thereby, the server 101 may easily identify the online users and the offline users and push the content accordingly. Thus, the network connectivity prediction module 209 may reduce double billing to the advertiser. For example, the Ad campaign management requires receiving responses from both the online users and the offline users. Thus, based on the prediction by the network connectivity prediction module 209, the server 101 may target the offline users who may come online within 3 hours. Therefore, the server 101 may wait for receiving the response from the user who may come online within 3 hours instead of trying to push the content again when the user is online. Therefore, the Ad campaign management may bill for one impression only instead of multiple impressions.

According to an embodiment, the data 213 refers to the information stored and executed by a computing device, such as the server 101. The data 213 in computer memory is typically represented in binary form, using a combination of 0s and 1s. the data 213 in the memory 111 is associated with specific data types, which define the type of values that can be stored, the operations that can be performed, and the memory space required. The data 213 in the memory 11 is manipulated and processed by the processor 109 and other hardware components using a plurality of instructions.

According to an embodiment, in operation, the central logic module 201 responsible for operating an Ad procedure initializes the content lookalike module 205 and the user lookalike module 207. Further, the central logic module 201 triggers the user device 105 to initialize a local logic coordination module, a network communication service, and a network connectivity monitor module. The local logic coordination module in the user device 105 is configured for coordinating various requests from the server 101 and accordingly responds to the various requests. The local logic coordination module is configured to receive multiple requests from the module 113 and thereby coordinate between the requests to transmit output to the server 101. The network communication service is an Application Programming Interface (API) in the user device 105 for communicating with the server 101 via the network 103. The network connectivity monitor module in the user device 105 may be configured to monitor network activity in the user device 105.

Initially, the central logic module 201 is configured to perform an offline process for identifying a plurality of target users based on one or more targeting criteria provided by the advertiser. In an alternative embodiment, the central logic 201 may be configured to process requests from one or more advertisers. Further, the central logic module 201 is configured to determine that the identified plurality of target users is likely to generate overall impressions. The central logic module 201 is configured to determine each of the plurality of target users if the information of each user is matching with the targeting criteria. The information of each user of the plurality of target users is retrieved from the user device. Further, the information includes any one of one or more demographic details, an age, a place of residence, etc. In addition, the user lookalike module 207 is configured to identify the plurality of target users based on one or more users with behaviors and characteristics similar to each determined user of the plurality of target users. Further, the content lookalike module 205 is configured to identify the plurality of target users based on one or more users similar to one or more users who have responded in one or more similar category Ads. For example, the advertisers have set criteria to show the Ads to people between 60 years and 65 years of age and living in a city PQR. The central logic module 201 is configured to receive information from the user engagement prediction module 203 based on data available in the demographic details available in the user device 105. Based on the demographic data, the central logic module 201 is configured to identify the plurality of target users matching the criteria set by the advertiser. Thereby, the central logic module 201 is configured to determine the total impressions required to be generated based on the budget set by the advertisers. Further, the user lookalike module 207 is configured to identify one or more users with behaviors and characteristics similar to each determined user. Also, the content lookalike module 205 is configured to identify one or more users who have responded to similar types of Ads earlier.

Upon identifying the plurality of target users, the network connectivity prediction module 209 is configured to identify the initial group of online users from the identified plurality of target users. The initial group of online users is a subset of the plurality of the identified target users. Subsequently, the central logic module 201 is configured to push one or more content or Ads on the user device 105 of each user of the initial group of online users to display the one or more content or Ads in the lock screen of the user device. The pushing of the one or more Ads in the user device at an initial phase may correspond to a calibration phase, which may be executed for an initial time period (for example, 24 hours to 48 hours). The central logic module 201 is configured to perform the calibration phase on the initial group of online users to understand how well the online users respond to the Ads, and also how well the targeting requirements are being satisfied from the advertisers' perspective. The initial group of online users corresponds to one or more users whose user device 105 is connected via the active internet connection through the network 103. Upon pushing the one or more Ads on the user device 105, the central logic module 201 is configured to receive a plurality of initial responses from one or more users of the initial group of online users for the one or more content displayed on the lock screen of the user device 105.

Based on a number of the plurality of initial responses, the central logic module 201 is configured to compare the number of the plurality of initial responses with a predetermined threshold value. As a result of the comparison, if the number of the plurality of initial responses is greater than the predetermined threshold value, then the central logic module 201 is configured to identify a first group of users. The first group of users is identified for pushing the one or more content on the user device 105 of each of the first group of users. The first group of users is identified based on a similarity ranking process performed by the central logic module 201. In the similarity ranking process, the user lookalike module 207 is configured to identify users that exhibit similar traits, behaviors, and demographic attributes to the initial group of online users. The similarity ranking process is achieved by populating a feature vector that represents a user and in essence comparing a distance of other feature vectors from a target user. Two users are more alike if the distance is closer. The content lookalike module 205 may also be configured to determine the first group of users based on lookalike users who have responded to similar types of previous one or more Ads. Further, the network connectivity prediction module 209 is configured to predict the likely network connectivity in the future. The network connectivity prediction module 209 is configured to use data from the network connectivity log and the fourth Machine Learning model to generate predictions. The network connectivity prediction module 209 may be extended to include the context log if the network connectivity prediction module 209 is deployed on the user's device 105. In a non-limiting example, the network connectivity prediction module 209 is configured to provide output that the user X is going to have WiFi connectivity for the next 3 hours. Upon determining the similarity ranking, Ad lookalike, and network prediction, the central logic module 201 is configured to determine the first group of users from the plurality of identified target users comprising a first set of online users and a first set of offline users. The first set of online users corresponds to one or more users whose user device 105 is connected via the active internet connection. The first set of offline users corresponds to the one or more users whose user device 105 is disconnected from the active internet connection and thereby connects to the active internet connection after some time. Further, the first group of users is having users other than users in the initial group of online users. Furthermore, one or more content are pushed into the user device 105 of the first group of users when the user device 105 is connected via the active internet connection through the network 103.

Therefore, the network connectivity prediction module 209 is configured to determine the online users and the offline users who are offline during a specific time period. The network connectivity prediction module 209 may also be configured to determine the users who are going to be offline after a certain time period. The determination of online users and offline users is performed for displaying the content or Ads in order to accurately project Ad engagement for the offline users and the online users.

Upon determining the online users and the offline users, the central logic module 201 is configured to perform an execution phase (following the calibration phase) by pushing one or more content or Ads in the user device 105 of each of the first group of users, which includes the first set of online users and the first set of offline users. Subsequently, the central logic module 201 is configured to receive a plurality of first responses from one or more users of the first set of online users and the first set of offline users. The plurality of first responses is received based on the pushed one or more content or Ads in the user device 105. The central logic module 201 is configured to receive the plurality of first responses from one or more users of the first set of offline users once the first set of offline users becomes online.

Upon receiving the plurality of first responses, the central logic module 201 is configured to determine a performance of the plurality of first responses from the one or more users of first set of online users. Further, the central logic module 201 is configured to determine a performance of the plurality of first responses from the first set of offline users. The central logic module 201 is further configured to compare the performance of the first set of offline users with the performance of the first set of online users, where the response from the second set of offline users may be delayed due to being offline. In the result of comparison, if the performance of the first set of offline users is greater than or equal to the performance of the first set of online users, then the central logic module 201 is configured to identify the second set of offline users. The central logic module 201 is configured to identify the second set of offline users based on demographic attributes similar to the demographic attributes of the first set of offline users. The second set of offline users is a subset of the plurality of identified target users other than the first group of users and the initial group of online users. Upon identifying the second set of offline users, the central logic module 201 is configured to combine the second set of offline users into the first set of offline users. Upon combining, the central logic module 201 is configured to expand the first set of offline users by the second set of offline users for pushing the one or more content in the user device 105 of each user of the expanded first set of offline users. Further, the central logic module 201 is configured to receive the plurality of second responses once each of the one or more users of the expanded first set of offline users becomes online. In the result of comparison, if the performance of the first set of offline users is lesser than the performance of the first set of online users, then the central logic module 201 is configured to discontinue the pushing of one or more content to the first group of users. Subsequently, the central logic module 201 is configured to refine the targeting criteria by only targeting one or more online users. Thus, the central logic module 201 is configured to identify one or more online users similar to the initial group of online users for pushing one or more content into each of the user devices 105 of the identified one or more online users. The performance of the responses is determined by the CTR of the displayed one or more content or Ads. The CTR is a metric to measure the effectiveness of the Ads or campaign in terms of the number of clicks receives relative to the number of impressions. For example, if 1000 impressions are pushed in 1000 user devices, and the server 101 receives 300 responses, then the CTR is (300/1000)*100=30%.

Upon expanding the first set of offline users, the central logic module 201 is configured to receive a plurality of second responses from one or more users of the expanded first set of offline users. Thereby, the central logic module 201 is configured to predict the content consumption for the plurality of target users based on the plurality of initial responses, the plurality of first responses, and the plurality of second responses. The central logic module 201 is configured to predict the content consumption in the lock screen based on a fifth machine learning model. The fifth machine learning model is configured to receive the corresponding responses and thereby predict the content consumption based on particular responses provided by each of the one or more users. In a non-limiting example, the plurality of initial responses corresponds to 60% CTR, the plurality of first responses corresponds to 70% CTR, and the plurality of second responses corresponds to 50% CTR. Thus, based on the combined responses, the fifth machine learning model is configured to predict that overall content consumption is 65% CTR.

Thereby, the central logic module 201 is configured to transmit the predicted content consumption to a third-party server 107 via the network 103 for analyzing the content consumption of the one or more content or Ads. Upon authenticating the content consumption, the advertisers may view the performance of the content consumption via various forms of reports.

The first machine learning model, the second machine learning model, the third machine learning model, the fourth machine learning model, and the fifth machine learning model are configured for user engagement prediction, content lookalike users, similarity ranking, network connectivity prediction, and content consumption respectively, based on training with past user interactions on the server 101.

According to another embodiment, if the plurality of initial responses is lesser than the predetermined threshold value, then the central logic module 201 is configured to identify one or more online users similar to the initial group of online users. The plurality of initial responses greater than the predetermined threshold value corresponds to receiving good responses from the initial group of online users. Upon receiving good responses, the central logic module 201 enhances scope of the search to the first set of online users and the first set of offline users. Otherwise, the central logic module 201 enhances the scope for one or more online users only.

According to yet another embodiment, the central logic module 201 is configured to determine a second set of offline users based on demographic attributes similar to the demographic attributes of the first set of offline users. The second set of offline users is similar but not identical to the first set of offline users. The second set of offline users is a smaller percentage of the first set of offline users. Upon determining the second set of offline users, the central logic module 201 pushes the one or more content or Ads into the user device 105 of each of the second set of offline users. The first set of offline users or the second set of offline users corresponds to one or more users who become online after passing the predicted time period. Further, the predicted time period is determined based on a network connectivity log of the user device 105 and the fourth machine learning model.

According to yet another embodiment, during a critical stage, i.e., during the finishing time of the campaign management, the central logic module 201 is configured to push the content or Ad to one or more online users only. The one or more online users are identified to receive more responses during the critical phase to conclude the campaign. Further, the central logic module 201 is configured to increase the frequency of receiving the responses from the users during the critical stage and thereby calculate the content consumption more frequently to receive an outcome. According to yet another embodiment, the central logic module 201 may be configured to receive a plurality of third responses during the critical stage. Thereby, the central logic module 201 may use the thirst responses for determining the content consumption.

Figure 3:
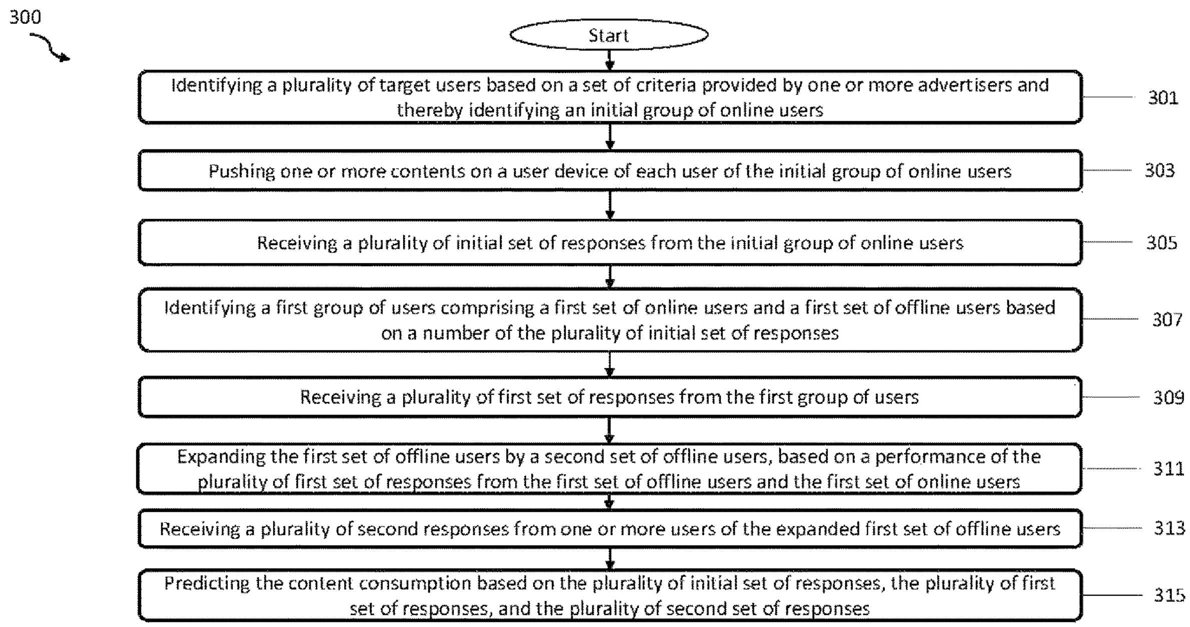
FIG. 3 is a flow chart of a method of predicting content consumption by a server, in accordance with an embodiment of the present disclosure.

FIG. 3 is a flow chart of a method of predicting content consumption by users being performed by a server, in accordance with an embodiment of the present disclosure. FIG. 3 illustrates the method 300 for predicting content consumption by the server 101. The method initializes execution from the start block of FIG. 3.

In Step 301, the method 300 comprises identifying the plurality of target users based on the one or more criteria provided by the advertiser. The identification of the plurality of target users is performed by the central logic module 201 in the offline process. The central logic module 201 is configured to identify the plurality of target users based on the set of targeting criteria provided by the advertiser. Further, the central logic module 201 receives input from the user engagement prediction module 203, the content lookalike module 205, and the user lookalike module 207 to finally identify the plurality of target users. The plurality of target users is identified for determining one or more sets within the plurality of target users for pushing the content in the user device 105 of the one or more sets. Upon identifying the plurality of target users, the central logic module 201 is configured to identify the initial group of online users from the plurality of target users. The initial group of online users is a subset of the plurality of the identified target users. The initial group of online users is identified for the calibration phase of the campaign, in which the central logic module 201 may require more responses from the online users in a short time. The flow of the method now proceeds to Step 303.

In Step 303, method 300 further comprises pushing the content or Ads on the user device 105 of each user of the initial group of online users from the plurality of identified target users to display the content or Ads in the lock screen of the user device 105. The lock screen may correspond to the home screen shown on the display 119 of the user device 105. The central logic module 201 is also configured to push the content on each user device 105 of the initial group of online users. Thus, in the calibration phase, the content is pushed on each user device 105 for displaying the content on the lock screen of the display 119 and for receiving one or more responses based on an interaction of the user with the displayed content. The flow of the method now proceeds to Step 305.

In Step 305, the method 300 further comprises receiving the plurality of initial responses from one or more users of the initial group of online users for the content displayed on the lock screen of the user device 105. The central logic module 201 is configured to receive the plurality of initial responses from the initial group of online users. The flow of the method now proceeds to Step 307.

In Step 307, the method 300 further comprises identifying the first group of users from the plurality of target users based on a number of the plurality of initial responses. The first group of users is identified for pushing the one or more content on the user device 105 of each of the first group of users. The first group of users having users other than users other than users in the initial group of online users. Further, the first group of users comprises the first set of online users and the first set of offline users. For identifying the first group of users, the method 300 comprises comparing the number of the plurality of initial responses with the predetermined threshold value. In the result of comparison, if the received plurality of initial responses is greater than the predetermined threshold value, the method comprises identifying the first group of users for pushing the one or more content on the user device 105 of each of the first group of users. The predetermined threshold value may be determined based on various heuristic methods and machine learning techniques. For example, in the heuristic method, the predetermined threshold value may be determined manually. Alternatively, in machine learning techniques, the predetermined threshold value may be determined based on budget, number of target users, and prior training data. The central logic module 201 is configured to perform the similarity ranking process to identify the first group of users which is lookalike to the initial group of online users. Further, the user lookalike module 207, the content lookalike module 205, and the network connectivity prediction module 209 may be configured to determine the first group of users including the first set of online users and the first set of offline users. Therefore, if the initial responses are more than the predetermined threshold value, the central logic module 201 enhances scope of target users by including offline users along with online users to receive more responses from the users. Further, the central logic module 201 may be configured to receive input from the network connectivity prediction module 209 to identify the activity of the offline users. The flow of the method now proceeds to Step 309.

In Step 309, the method 300 comprises receiving the plurality of first responses from one or more users of the first set of online users and the first set of offline users of the first group of users. The central logic module 201 is configured to receive the plurality of first responses from the first set of online users, and the first set of offline users when the first set of offline users become online. The flow of the method now proceeds to Step 311.

In Step 311, the method 300 further comprises determining the performance of the plurality of first responses from the first set of online users and the first set of offline users. Based on the comparison between the performance of the first set of online users and the first set of offline users, the method comprises expanding the first set of offline users by a second set of offline users. The first set of offline users is expanded for pushing the content in each user device 105 of the expanded first set of offline users. The central logic module 201 is configured to determine the performance of the plurality of first responses from each of the first set of online users and the first set of offline users. If the performance of the first set of offline users is greater than or equal to the performance of the first set of online users, the central logic module 201 is configured to expand the first set of offline users. The first set of offline users is expanded with the second set of offline users as the performance of the first set of offline users is better than the first set of online users. Thus, the central logic module 201 is configured to expand the number of offline users as the offline users respond well to the displayed content rather than the online users. The flow of the method now proceeds to Step 313.

In Step 313, the method 300 further comprises receiving the plurality of second responses from the expanded first set of offline users. The central logic module 201 is configured to receive the plurality of second responses from the expanded first set of offline users. Further, the response of the expanded first set of offline users may be delayed as the first set of offline users may be offline for a certain time period. The flow of the method now proceeds to Step 315.

In Step 315, the method 300 further comprises predicting the content consumption based on the plurality of initial responses, the plurality of first responses, and the plurality of second responses. The central logic module 201 is configured to predict the content consumption of the content published on the lock screen of the user device 105 based on the plurality of initial responses, the plurality of first responses, and the plurality of second responses. Therefore, the method comprises determining the content consumption from the online users and the offline users based on interaction with the content shown on the lock screen of the user device 105. Further, the central logic module 201 is configured to transmit the predicted content consumption to the third-party server 107 via the network 103 for analyzing the content consumption of the content or Ads.

Figure 4:
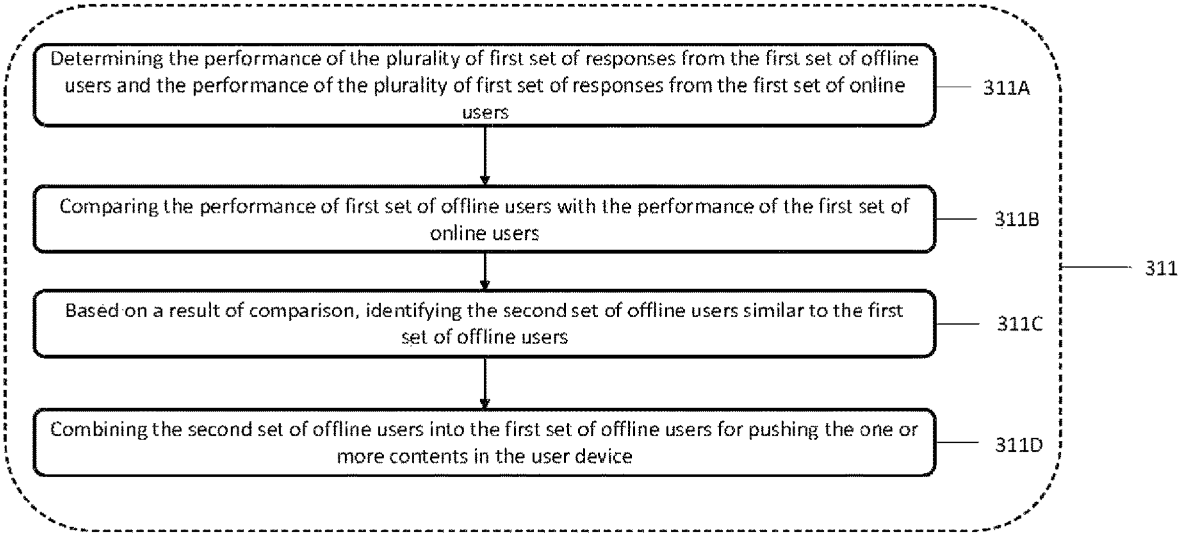
FIG. 4 is a detailed flow chart of a method of expanding the first set of offline users as described with reference to FIG. 3, in accordance with an embodiment of the present disclosure.

FIG. 4 is a detailed flow chart of a method of expanding the first set of offline users by the second set of offline users as described with reference to FIG. 3, in accordance with an embodiment of the present disclosure. FIG. 4 illustrates the detailed method Step 311 for expanding the first set of offline users by the second set of offline users.

In Step 311A, the method 311 comprises determining the performance of the plurality of first responses from the first set of offline users and the performance of the plurality of first responses from the first set of online users. The central logic module 201 is configured to determine the performance of the first responses based on the CTR from the first set of offline users and the first set of online users. Alternatively, the performance of the first responses is based on the number of responses received from each of the first set of offline users and the first set of online users. The method now proceeds to Step 311B.

In Step 311B, the method 311 comprises comparing the performance of the first set of offline users with the performance of the first set of online users. Upon determining the performance, the central logic module 201 is configured to compare the performance of the first set of offline users with the performance of the first set of online users. The method now proceeds to Step 311C.

In Step 311C, the method 311 comprises identifying, based on the result of comparison, the second set of offline users based on demographic attributes similar to the demographic attributes of the first set of offline users. In the result of comparison, if the performance of the first set of offline users is greater than equal to the performance of the first set of online users, then the central logic module 201 is configured to identify the second set of offline users having similarity with the first set of offline users. Thus, if the response performance of the offline users is better than that of the online users, the central logic module 201 is configured to determine the second set of offline users for expanding the offline users. The second set of offline users is a subset of the plurality of identified target users other than the first group of users and the initial group of online users. The method now proceeds to Step 311D.

In Step 311D, the method 311 comprises combining the second set of offline users into the first set of offline users for pushing the content in the user device 105 of each user of the combined set of the first set of offline users and the second set of offline users. Thus, the central logic module 201 is configured to combine the second set of offline users into the first set of offline users to expand the first set of offline users. Upon pushing the content in the user device 105 of the expanded first set of offline users, the central logic module 201 is configured to receive the plurality of second responses from the expanded first set of offline users.

Figure 5:
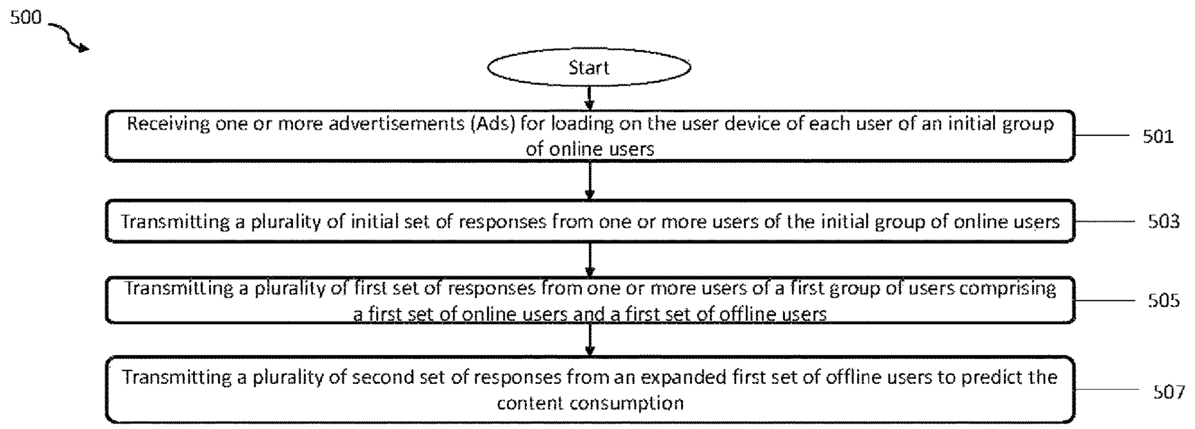
FIG. 5 is a flow chart of a method of predicting content consumption by a user device, in accordance with an embodiment of the present disclosure.

FIG. 5 is a flow chart of a method of predicting content consumption by a user device, in accordance with an embodiment of the present disclosure. FIG. 5 illustrates the method 500 for predicting content consumption by the users performed by the user device 105. The method initializes execution from the start block of FIG. 5.

In Step 501, the method 500 comprises receiving a content on each user of the user device 105 of an initial group of online users. The server 101 identifies the initial group of online users from a plurality of target users being identified based on one or more criteria provided by an advertiser. The central logic module 201 of the server 101 is configured to identify the plurality of target users based on the one or more criteria provided by the advertiser. The device processor 115 is configured to receive the content for pushing on the user device 105. The flow of the method now proceeds to Step 503.

In Step 503, the method 500 comprises transmitting a plurality of initial responses from one or more users of the initial group of online users based on the content displayed on the lock screen. The device processor 115 is configured to determine an interaction of each of the initial group of online users with the displayed content on the user device 105. Subsequently, the device processor 115 is configured to transmit the plurality of first responses based on the captured interaction from the user device 105 of one or more users of the initial groups of online users to the server 101 via the network 103. The flow of the method now proceeds to Step 505.

In Step 505, the method 500 comprises transmitting a plurality of first responses from one or more users of a first group of users comprising a first set of online users and a first set of offline users. The device processor 115 is configured to transmit the plurality of first responses from the first group of users to the server 101 via the network 103. The central logic module 201 is configured to determine the first group of users if the transmitted plurality of initial responses is greater than a predetermined threshold value. The initial group of online users and the first set of online users correspond to one or more users whose user device 105 is connected via the active internet connection. Further, the first set of offline users corresponds to the one or more users whose user device 105 is disconnected from the active internet connection. Furthermore, the content or Ads is pushed into the user device 105 when the user device 105 is connected via the active internet connection. The flow of the method now proceeds to Step 507.

In Step 507, the method 500 comprises transmitting a plurality of second responses from an expanded first set of offline users to predict the content consumption based on the transmitted initial responses, the first responses, and the second responses. The device processor 115 is configured to transmit the plurality of second responses to the server 101 via the network 103. The device processor 115 is configured to transmit the second responses from one or more users of the expanded first set of offline users. The central logic module 201 is configured to determine the performance of the plurality of first responses from the first set of online users and the first set of offline users. Further, the central logic module 201 is configured to expand the first set of offline users by a second set of offline users based on a comparison of the performance of the plurality of responses from the first set of online users and the first set of offline users.

Figure 6:
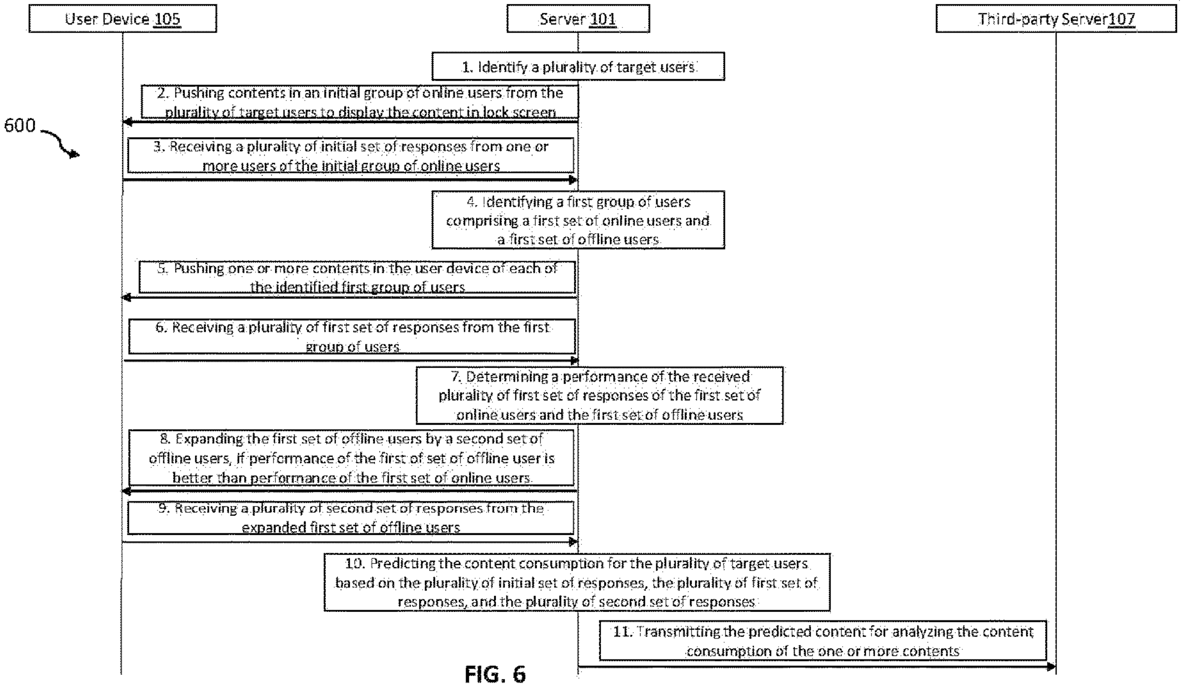
FIG. 6 is a sequence diagram of a method for predicting content consumption, in accordance with an embodiment of the present disclosure.

FIG. 6 is a sequence diagram of a method for predicting content consumption, in accordance with an embodiment of the present disclosure. In FIG. 6, the sequence diagram is based on the system 100 of FIG. 1 with respect to the user device 105, the server 101, and the third-party server 107.

According to an embodiment, FIG. 6 illustrates the method 600 disclosing a sequence of operations (operation 1 to Operation 11) for predicting content consumption. The sequence of events (operation 1 to Operation 11) is illustrated as follows:

At Operation 1 of method 600, the processor 109 of the server 101 is configured to identify a plurality of target users based on one or more criteria provided by an advertiser. The plurality of target users is identified to push content or Ads into the user device 105 of the plurality of target users.

At Operation 2 of method 600, the processor 109 of the server 101 is configured to push the content or Ads on the user device 105 of each user of an initial group of online users from the plurality of identified target users to display the content or Ads in the lock screen of the user device 105. The initial group of online users, identified from the plurality of target users, correspond to one or more users who are online and expected to respond immediately based on pushed content on the user device 105.

At Operation 3 of method 600, the processor 109 of the server 101 is configured to receive a plurality of initial responses from one or more users of the initial group of online users for the one or more content displayed on the lock screen of the user device 105.

At Operation 4 of method 600, if the received plurality of initial responses is greater than the predetermined threshold value, the processor 109 of the server 101 is configured to identify the first group of users comprising the first set of online users and the first set of offline users for pushing content or Ads in the user device 105 of each of the first group of users. The first group of users is identified from the plurality of identified target users.

At Operation 5 of method 600, upon determining the first group of users, processor 109 of server 101 is configured to push the content or Ads in the user device 105 of each of the determined first group of users.

At Operation 6 of method 600, the processor 109 of the server 101 is configured to receive the plurality of first responses from one or more users of the first group of users. The processor 109 is configured to receive the plurality of first responses from the user device 105 of the one or more users of the first group of users.

At Operation 7 of method 600, the processor 109 of the server 101 is configured to determine the performance of the received plurality of first responses from the first set of online users and the first set of offline users. At Operation 8 of method 600, based on the determined performance, the processor 109 of the server 101 is configured to expand the first set of offline users. If the determined performance of the first set of offline users is greater than or equal to the performance of the first set of online users, then the processor 109 is configured to expand the first set of offline users by a second set of offline users. Upon expanding the first set of offline users, the processor 109 of the server 101 is configured to push the content or Ads into the user device 105 of each user of the second set of offline users.

At Operation 9 of method 600, the processor 109 of the server 101 is configured to receive a plurality of second responses from one of the expanded first set of offline users.

At Operation 10 of method 600, the processor 109 of the server 101 is configured to predict the content consumption based on the plurality of initial responses, the plurality of first responses, and the plurality of second responses. The content consumption is determined based on the number of users who responded to the pushed content or Ads in the lock screen of the user device 105.

At Operation 11 of method 600, the processor 109 of the server 101 is configured to transmit the predicted content consumption to the third-party server 107 via the network 103 for analyzing the content consumption of the one or more Ads.

Referring now to the technical abilities and effectiveness of the method and system disclosed herein. The present disclosure provides the technical advantages of displaying content or Ads on the lock screen of the user device even though the user is in offline state. Therefore, the present disclosure advantageously predicts content consumption based on the interactions of the users during the online state and the offline state, who become online after some time. Further, the present disclosure accurately determines the content consumption by making accurate predictions of user interactions during offline state. Therefore, the present method results in meeting advertiser objectives more consistently and maximizing revenue opportunities by reducing non-billable Ad impressions to the advertisers. Further, the present disclosure accurately predicts the online or offline duration activity of the user to identify whether to push the content on the user device of the corresponding user. Furthermore, the present disclosure also predicts when the offline user may become online to receive the response from the offline user to predict overall content consumption.

Figure 7:
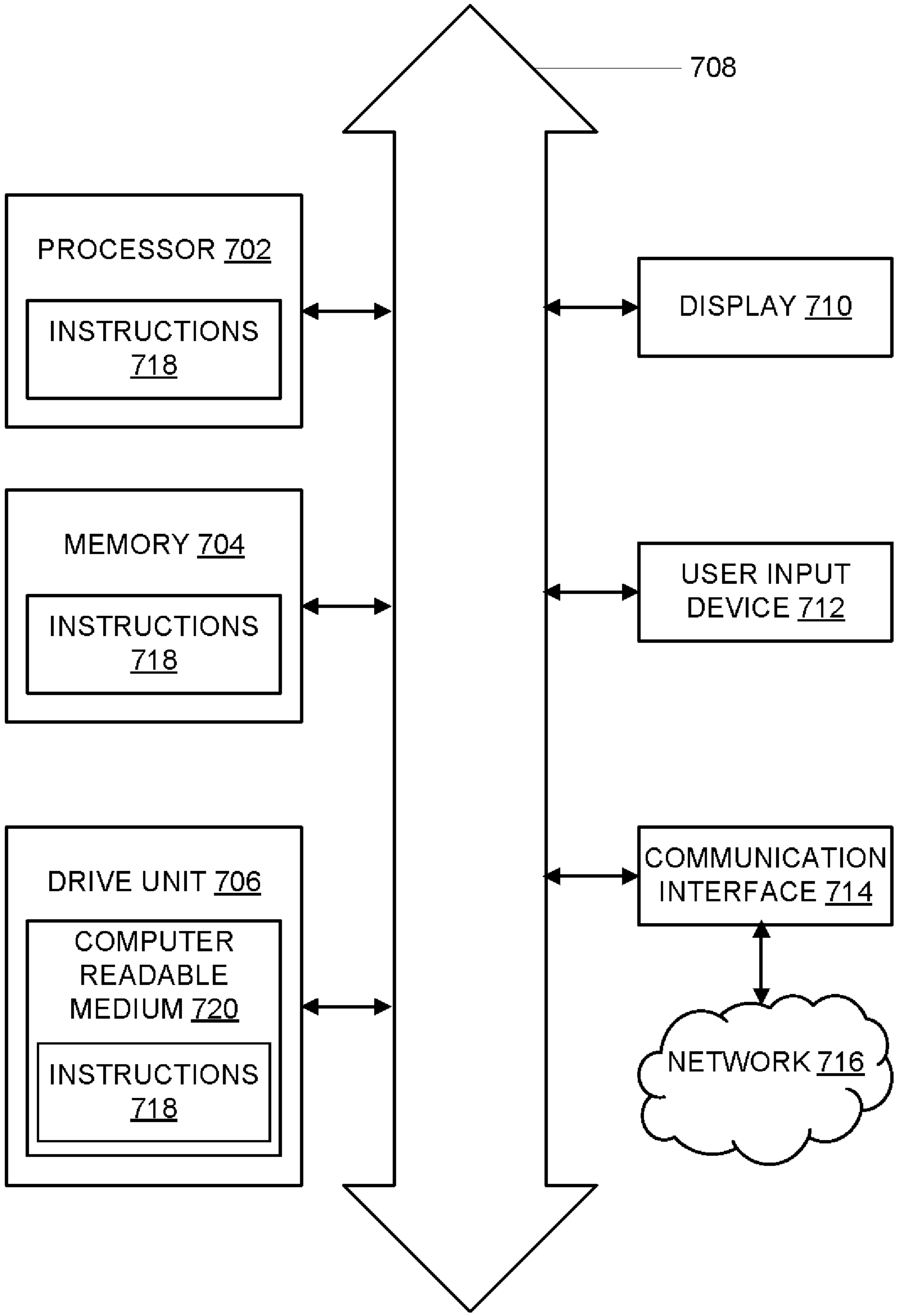
FIG. 7 illustrates an exemplary implementation of a typical hardware configuration, in accordance with an embodiment of the present disclosure.

Referring now to FIG. 7 of the Drawings, illustrate an exemplary implementation of a typical hardware configuration of the server 101 or the user device 105 in the form of a computer system 700, in accordance with an embodiment of the present disclosure. The computer system 700 can include a set of instructions that can be executed to cause the computer system 700 to perform any one or more of the methods disclosed. The computer system 700 may operate as a standalone device or may be connected, e.g., using a network, to other computer systems or peripheral devices.

In a networked deployment, the computer system 700 may operate in the capacity of a server or as a client-user computer in a server-client user network environment, or as a peer computer system in a peer-to-peer (or distributed) network environment. The computer system 700 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702 e. g., a central processing unit (CPU), a graphics processing unit (GPU), or both. The processor 702 may be a component in a variety of systems. As an exemplary embodiment, the processor 702 may be part of a standard personal computer or a workstation. The processor 702 may be one or more general processors, digital signal processors, application-specific integrated circuits, field-programmable gate arrays, servers, networks, digital circuits, analog circuits, combinations thereof, or other now-known or later developed devices for analyzing and processing data. The processor 702 may implement a software program, such as code generated manually (i. e., programmed).

The computer system 700 may include a memory 704, such as a memory 704 that can communicate via a bus 708. The memory 704 may include but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, memory 704 includes a cache or random-access memory for the processor 702. In alternative examples, the memory 704 is separate from the processor 702, such as a cache memory of a processor, the system memory, or other memory. The memory 704 may be an external storage device or database for storing data. The memory 704 is operable to store instructions executable by the processor 702. The functions, acts, or tasks illustrated in the figures or described may be performed by the programmed processor 702 for executing the instructions stored in the memory 704. The functions, acts, or tasks are independent of the particular type of instruction set, storage media, processor, or processing strategy and may be performed by software, hardware, integrated circuits, firmware, micro-code, and the like, operating alone or in combination. Likewise, processing strategies may include multiprocessing, multitasking, parallel processing, and the like.

As shown, the computer system 700 may or may not further include a display unit 710, such as a liquid crystal display (LCD), an organic light-emitting diode (OLED), a flat panel display, a solid-state display, a projector, a printer or other now known or later developed display device for outputting determined information. The display 710 may act as an interface for the user to see the functioning of the processor 702, or specifically as an interface with the software stored in the memory 704 or the drive unit 706.

Additionally, the computer system 700 may include an input device 712 configured to allow a user to interact with any of the components of system 700. The computer system 700 may also include a disk or optical drive unit 706. The disk drive unit 706 may include a computer-readable medium 720 in which one or more sets of instructions 718, e. g., software, can be embedded. Further, instruction 718 may embody one or more of the methods or logic as described. In a particular example, the instruction 718 may reside completely, or at least partially, within the memory 704 or the processor 702 during execution by the computer system 700.

The present invention contemplates a computer-readable medium that includes instructions 718 or receives and executes instructions 718 responsive to a propagated signal so that a device connected to a network 716 can communicate voice, video, audio, and images or any other data over the network 716. Further, instructions 718 may be transmitted or received over the network 716 via a communication port or interface 714 or using a bus 708. The communication port or interface 714 may be a part of the processor 702 or maybe a separate component. The communication port 714 may be created in software or maybe a physical connection in hardware. The communication port 714 may be configured to connect with a network 716, external media, the display 710, or any other components in system 700, or combinations thereof. The connection with the network 716 may be a physical connection, such as a wired Ethernet connection, or may be established wirelessly as discussed later. Likewise, the additional connections with other components of the system 700 may be physical or may be established wirelessly. The network 716 may alternatively be directly connected to bus 708.

The network 716 may include wired networks, wireless networks, Ethernet AVB networks, or combinations thereof. The wireless network may be a cellular telephone network, an 802.11, 802.16, 802.20, 802.1Q, or WiMax network. Further, the network 716 may be a public network, such as the Internet, a private network, such as an intranet, or combinations thereof, and may utilize a variety of networking protocols now available or later developed including, but not limited to TCP/IP-based networking protocols. The system is not limited to operation with any particular standards and protocols. As an exemplary embodiment, standards for Internet and other packet-switched network transmissions (e. g., TCP/IP, UDP/IP, HTML, and HTTP) may be used.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

We claim:

1. A method for predicting content consumption by offline and online users of user devices and adapting to offline user devices, the method comprising:

pushing, by a server, one or more content to a user device of each user of an initial group of online users for displaying the one or more content on a lock screen of the user device;

receiving, by the server, a plurality of initial responses, from one or more users of the initial group of online users, to each of the one or more content displayed on the lock screen of the user device;

identifying, by the server, based on a number of the plurality of initial responses, a first group of users for pushing the one or more content on the user device of each of the first group of users, the first group of users having users other than users in the initial group of online users, and comprises a first set of online users and a first set of offline users;

for at least a plurality of the first group of users, deploying a network connectivity prediction module to the user devices of the plurality of the first group of users, wherein the network connectivity prediction module is configured to use data from a network connectivity log and machine learning to determine: (i) the online users, (ii) the offline users who are offline during a specific time period, and (iii) the users who are going to be offline after a certain time period;

for each of the first set of offline users having the deployed network connectivity module, predicting, by the network connectivity module, when the offline user is likely to return to an online state;

for each of the first set of offline users without the deployed network connectivity module, predicting, by the server, when the offline user is likely to return to an online state based on logged user offline and online activity;

for each of the first set of offline users, when the user device of the offline user is predicted to return to an online state, waiting, by the server, for a period of time for the device of the offline user to come online to receive a response from the user;

receiving, by the server, a plurality of first responses from one or more users of the first set of online users and the first set of offline users of the first group of users;

expanding, by the server, the first set of offline users by a second set of offline users for pushing the one or more content, based on a performance of the plurality of first responses from the first set of offline users and the first set of online users;

receiving, by the server, a plurality of second responses from one or more users of the expanded first set of offline users; and predicting, by the server, the content consumption based on the plurality of initial responses, the plurality of first responses, and the plurality of second responses.

2. The method as claimed in claim 1, wherein pushing the one or more content comprises:

identifying, by the server, a plurality of target users based on one or more criteria provided by an advertiser; and identifying, by the server, the initial group of online users from the identified plurality of target users for pushing the one or more content, wherein the initial group of online users is a subset of the plurality of the identified target users.

3. The method as claimed in claim 1, wherein identifying the first group of users comprises:

comparing the number of the plurality of initial responses with a predetermined threshold value; and based on a result of comparison, identifying the first group of users for pushing the one or more content on the user device of each of the first group of users.

4. The method as claimed in claim 1, wherein expanding the first set of offline users by the second set of offline users comprises:

determining the performance of the plurality of first responses from the first set of offline users and a performance of the plurality of first responses from the first set of online users;

comparing the performance of the plurality of first responses from the first set of offline users with the performance of the plurality of first responses from the first set of online users;

based on a result of the comparison, identifying the second set of offline users based on demographic attributes similar to the demographic attributes of the first set of offline users, wherein the second set of offline users is a subset of the plurality of identified target users other than the first group of users and the initial group of online users; and combining the second set of offline users with the first set of offline users for pushing the one or more content to the user device of each user of the combined set of the first set of offline users and the second set of offline users.

5. The method as claimed in claim 4, wherein based on the result of comparison, the method comprises:

discontinuing the pushing of one or more content to the first group of users based on the performance of the first set of offline users being lesser than the performance of the first set of online users; and identifying, by the server, one or more online users similar to the initial group of online users for pushing one or more content to each of the user device of the identified one or more online users.

6. The method as claimed in claim 1 comprises:

transmitting, by the server, the predicted content consumption to a third-party server for analyzing the content consumption of the one or more content.

7. The method as claimed in claim 1, wherein:

the initial group of online users and the first set of online users correspond to one or more users whose user device is connected via an active internet connection;

the first set of offline users and the second set of offline users corresponds to the one or more users whose user device is disconnected from the active internet connection; and the one or more content are pushed into the user device when the user device is connected via the active internet connection.

8. The method as claimed in claim 1 comprises:

receiving the plurality of first responses from the one or more users of the first set of offline users once each of the one or more users of the first set of offline users becomes online, and receiving the plurality of second responses from one or more users of the expanded first set of offline users once each of the one or more users of the expanded first set of offline users becomes online.

9. The method as claimed in claim 2, wherein identifying the plurality of target users comprises:

predicting user engagement with the one or more content using a first machine learning model;

identifying one or more users similar to one or more users who have responded to one or more similar categories of content, using a second machine learning model; and identifying one or more users with behaviors and characteristics similar to each identified user of the plurality of target users using a third machine learning model.

10. The method as claimed in claim 1, wherein one of the first set of offline users and the second set of offline users is one or more users who come online after passing a predicted time period, wherein the predicted time period is predicted based on a network connectivity log of each user device and using a fourth machine learning model.

11. The method as claimed in claim 1, wherein the prediction of the content consumption in the lock screen is performed using a fifth machine learning model.

12. A method of predicting content consumption by users of user device, the method comprising:

receiving one or more content by a user device on each user of an initial group of online users identified, by a server, from a plurality of target users based on a set of criteria provided by an advertiser;

transmitting to the server by the user device, a plurality of initial responses from one or more users of the initial group of online users to the one or more content displayed on the lock screen;

transmitting to the server, by the user device, a plurality of first responses from one or more users of a first group of users comprising a first set of online users and a first set of offline users, wherein the server identifies the first group of users based on the plurality of initial responses in comparison with a predetermined threshold value;

transmitting, by the user device, a plurality of second responses from an expanded first set of offline users to predict the content consumption based on the transmitted initial responses, the first responses, and the second responses, wherein the server; expands the first set of offline users by a second set of offline users based on a performance of the plurality of first responses from the first set of offline users and the first set of online users;

transmitting to the server a prediction determined by a network connectivity prediction module deployed on at least a plurality of the first group of users, a prediction of when the first set of offline users will be online, wherein the a network connectivity prediction module is configured to use data from a network connectivity log and machine learning to determine: (i) the online users, (ii) the offline users who are offline during a specific time period, and (iii) the users who are going to be offline after a certain time period;

for each of the first set of offline users, when the user device of the offline user is predicted to return to an online state, waiting for a period of time for the device of the offline user to come online to receive a response from the user.

13. The method as claimed in claim 12, wherein:

the initial group of online users and the first set of online users correspond to one or more users whose user device is connected via an active internet connection;

the first set of offline users and the second set of offline users corresponds to the one or more users whose user device is disconnected from the active internet connection; and the one or more content are received in the user device when the user device is connected via the active internet connection.

14. The method as claimed in claim 12, wherein the method includes:

transmitting the plurality of first responses from the one or more users of the first set of offline users once each of the one or more users of the first set of offline users comes online; and transmitting the plurality of second responses from one or more users of the expanded first set of offline users once each of the one or more users of the expanded first set of offline users comes online.

15. A system for predicting content consumption by users, the system comprising:

a server comprising a processor communicatively connected to a memory and the processor configured to:

push one or more content to a user device of each user of an initial group of online users for displaying the one or more content on a lock screen of the user device;

receive a plurality of initial responses, from one or more users of the initial group of online users, to the one or more content displayed on the lock screen of the user device;

identify, based on a number of the plurality of initial responses, a first group of users for pushing the one or more content to the user device of each of the first group of users, the first group of users being other than the initial group of online users and having a first set of online users and a first set of offline users;

for at least a plurality of the first group of users, deploy a network connectivity prediction module to the user devices of the plurality of the first group of users, wherein the network connectivity prediction module is configured to use data from a network connectivity log and machine learning to determine: (i) the online users, (ii) the offline users who are offline during a specific time period, and (iii) the users who are going to be offline after a certain time period;

for each of the first set of offline users having the deployed network connectivity module, predict, by the network connectivity module, when the offline user is likely to return to an online state;

for each of the first set of offline users without the deployed network connectivity module, predict when the offline user is likely to return to an online state based on logged user offline and online activity;

for each of the first set of offline users, when the user device of the offline user is predicted to return to an online state, wait for a period of time for the device of the offline user to come online to receive a response from the user;

receive a plurality of first responses from one or more users of the first set of online users and the first set of offline users;

expand the first set of offline users by a second set of offline users for pushing the one or more content, based on a performance of the plurality of first responses from the first set of offline users and the first set of online users;

receive a plurality of second responses from one or more users of the expanded first set of offline users; and predict the content consumption based on the plurality of initial responses, the plurality of first responses, and the plurality of second responses.

16. The system as claimed in claim 15, wherein, to push one or more content, the processor is configured to:

identify a plurality of target users based on one or more criteria provided by an advertiser; and identify the initial group of online users from the identified plurality of target users for pushing the one or more content, wherein the initial group of online users is a subset of the plurality of the identified target users.

17. The system as claimed in claim 15, wherein, to identify the first group of users, the processor is configured to:

compare the number of the plurality of initial responses with a predetermined threshold value; and based on a result of comparison, identify the first group of users for pushing the one or more content to the user device of each of the first group of users.

18. The system as claimed in claim 15, wherein when the determined performance of the first set of offline users is greater than or equal to the performance of the first set of online users, the processor is configured to expand the first set of offline users with the predefined number of offline users.

19. The system as claimed in claim 15, wherein, to expand the first set of offline users by the second set of offline users, the processor is configured to:

determine the performance of the plurality of first responses from the first set of offline users and the performance of the plurality of first responses from the first set of online users;

compare the performance of the first set of offline users with the performance of the first set of online users;

based on a result of comparison, identify the second set of offline users based on demographic attributes similar to the demographic attributes of the first set of offline users, wherein the second set of offline users is a subset of the plurality of identified target users other than the users in the first group of users and the users in the initial group of online users; and combine the second set of offline users with the first set of offline users for pushing the one or more content to the user device of each user of the combined set of the first set of offline users and the second set of offline users.

20. The system as claimed in claim 17, wherein based on the result of comparison, the processor is further configured to:

discontinue pushing one or more content to the first group of users based on the performance of the first set of offline users being lesser than the performance of the first set of online users.

* * * * *